(12) United States Patent
Herting

(10) Patent No.: US 6,425,641 B1
(45) Date of Patent: Jul. 30, 2002

(54) SPOKED CYCLE WHEEL

(75) Inventor: Eric Herting, Valencia, CA (US)

(73) Assignee: Jas. D. Easton, Inc., Van Nuys, CA (US)

( * ) Notice: Subject to any disclaimer, the term of this patent is extended or adjusted under 35 U.S.C. 154(b) by 0 days.

(21) Appl. No.: 09/782,829

(22) Filed: Feb. 13, 2001

(51) Int. Cl.[7] .............................. B60B 1/02; B60B 3/00; B60B 25/00; B60B 21/06

(52) U.S. Cl. ............... 301/58; 301/64.704; 301/64.706; 301/95.11

(58) Field of Search .......................... 301/35.53, 35.56, 301/35.57, 55, 58, 64.701, 64.704, 64.706, 67, 95.101, 95.102, 95.11, 64.101, 64.201, 65, 95.104, 73, 79, 95.107, 95.108

(56) References Cited

U.S. PATENT DOCUMENTS

| | | | |
|---|---|---|---|
| 759,124 A | * 5/1904 | Oswald | 301/64.101 |
| 1,295,792 A | * 2/1919 | Putnam | 301/64.704 |
| 1,371,382 A | * 3/1921 | Ledwinka | 301/58 |
| 1,402,003 A | * 1/1922 | Miller | 301/58 |
| RE19,010 E | * 11/1933 | Smith | 301/58 |
| 2,034,360 A | * 3/1936 | Sill | 301/58 |
| 4,483,729 A | * 11/1984 | Fujisaki et al. | 301/95.11 |
| 4,793,659 A | * 12/1988 | Oleff et al. | 301/95.11 |
| 5,826,948 A | * 10/1998 | Schroeder et al. | 301/64.706 |

* cited by examiner

Primary Examiner—S. Joseph Morano
Assistant Examiner—Jason R. Bellinger
(74) Attorney, Agent, or Firm—Roth & Goldman, PA

(57) ABSTRACT

A multi-part lightweight easily extruded or molded wheel rim and wheel particularly for cycling with joined flanges which extend radially inwardly toward the center of the rim and wheel provides strength not found in conventional channel shaped rims. The radially extending flanges are provided with apertures for receiving bent ends of spokes for assembling the rim and a hub to form a wheel which receives an inflatable tubeless or tube tire which need not be dismounted from the rim when repairing or replacing spokes.

22 Claims, 2 Drawing Sheets

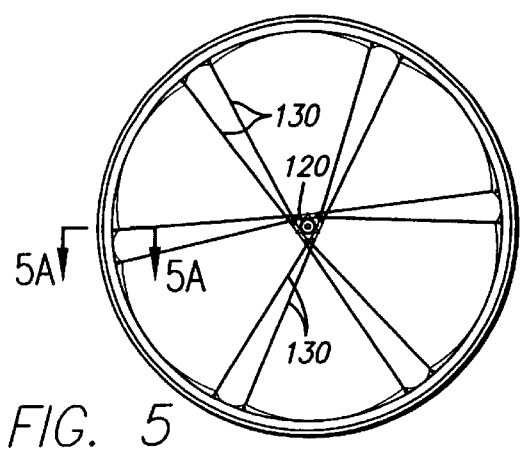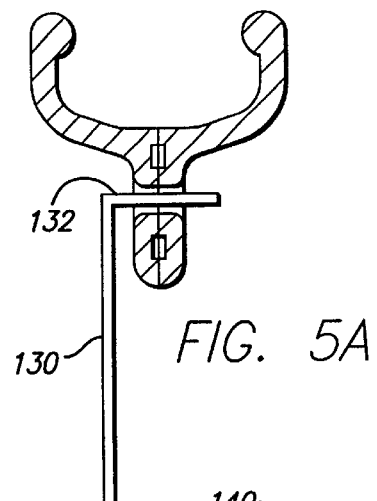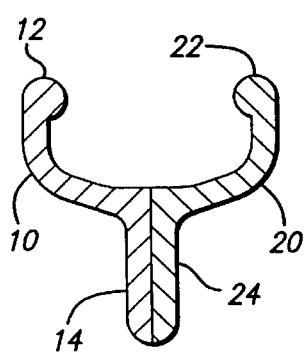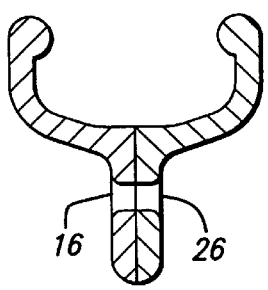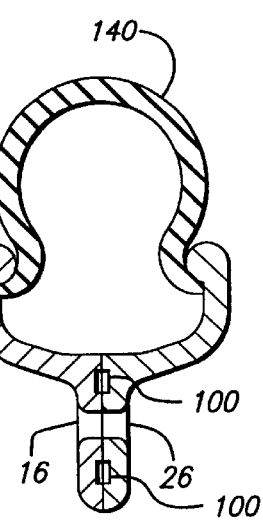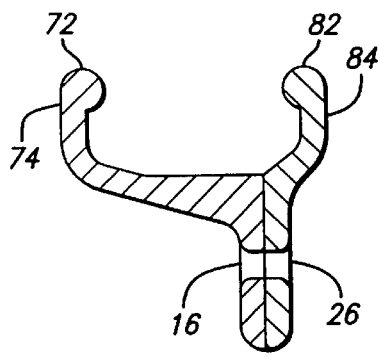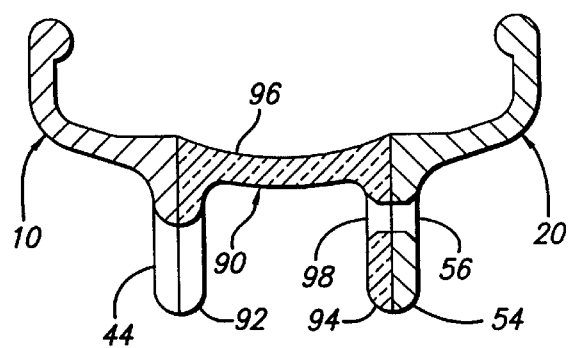

SPOKED CYCLE WHEEL

CROSS REFERENCE TO RELATED APPLICATIONS, IF ANY

None.

BACKGROUND OF THE INVENTION AND PRIOR ART

The present invention relates to spoked cycle wheels, particularly lightweight wheels for bicycles, although the disclosure is also applicable to other types of spoked wheels.

Many different types of bicycle wheel rims are known including single part rims of generally channel shaped cross section which have a number of spoke receiving apertures in the rim and attached rotatable threaded nuts for tightening and retaining the outer threaded ends of wheel spokes. Such rims are unsuitable for changing spokes without dismounting the tire from the rim and are substantially dependent on the tensioning of the spokes to keep the wheel in round since the channel configuration of the rim is susceptible to bending and distortion.

OBJECT OF THE INVENTION

The primary objective of the invention is to provide a sturdy easy to manufacture lightweight cycle rim which is less susceptible to distortion than prior art rims particularly for tubeless inflatable tires in which spokes interconnecting the rim to a hub portion of the cycle wheel can be replaced without deflating or dismounting the tire.

SUMMARY OF THE INVENTION

The present invention provides a multi-part rim for a cycle wheel comprising an annular first rim member having an integrally formed tire retention bead and a radially inwardly extending flange laterally offset from said bead, an annular second rim member having an integrally formed tire retention bead and a radially inwardly extending flange laterally offset from said bead, said flanges of said first rim member and said second rim member being affixed together and said beads being laterally spaced apart to define a wheel rim, and at least one of said flanges having circumferentially spaced spoke retention apertures therein.

BRIEF DESCRIPTION OF THE DRAWINGS

FIG. 5 is an elevation view of a spoked wheel comprising a fifth embodiment of the invention having an aligned scalloped configuration with spokes arranged in pairs.

FIG. 5A is a cross-section taken at line 5A—5A in FIG. 5.

FIG. 6 is a radial cross-section taken at line 6—6 in FIG. 1.

FIG. 7 is a radial cross-section taken at line 7—7 in FIG. 1.

FIG. 8 is a radial cross-section taken at line 8—8 in FIG. 1 and showing a tubeless tire affixed to the rim.

FIG. 9 is a radial cross-section of a sixth non-symmetrical embodiment of the invention.

FIG. 10 is a radial cross-section of a seventh embodiment of the invention comprising a three part rim.

DESCRIPTION OF THE PREFERRED EMBODIMENT

Figure 1:
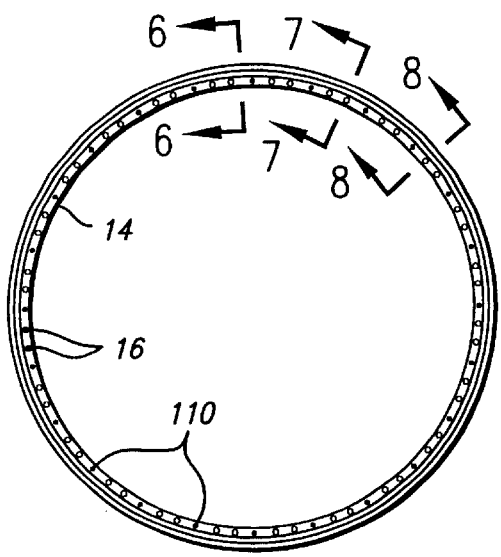
FIG. 1 is an elevation view of a riveted multi-part wheel rim according to a first embodiment of the invention.

Referring first to FIGS. 1 and 6 through 8, in a first embodiment, the present invention comprises a symmetrical wheel rim formed of two mirror image parts which may be made of extruded metal or metal alloy such as aluminum or titanium alloy or the parts may be manufactured from molded composite fiber reinforced resins. An annular first rim member 10 as best seen in FIGS. 6–8 includes an integrally formed tire retention bead 12 and a radially inwardly extending flange 14 which is laterally offset (in the direction of the center axis of the rim) from the bead. An annular second rim member 20 which is a mirror image of the first rim member 10 has a similarly configured tire retention bead 22 and a radially inwardly extending flange 24 laterally offset from the bead 22. The flanges 14, 24 of the first rim member 10 and of the second rim member 20 are permanently joined together in a suitable fashion such that the tire retention beads, 12, 22 are laterally spaced from each other to receive and retain radially inner edges of a tubeless tire 140 seen in FIG. 8. Any manner of affixing the opposed flanges 14, 24 securely together so as to withstand the normal stresses associated with cycling can be employed. If the rim members 10, 20 are made of metal or metal alloy, a plurality of equally spaced rivets 110 as shown in FIG. 1 provides one suitable method for affixing the flanges 14, 24 to each other. Alternatively, continuous or spot welding can be used for this purpose. On the other hand, if the rim members 10, 12 are formed of composite material, various suitable adhesive bonding agents well known to persons skilled in the art can be employed to permanently affix the rim members 10, 20 to each other.

Figure 2:
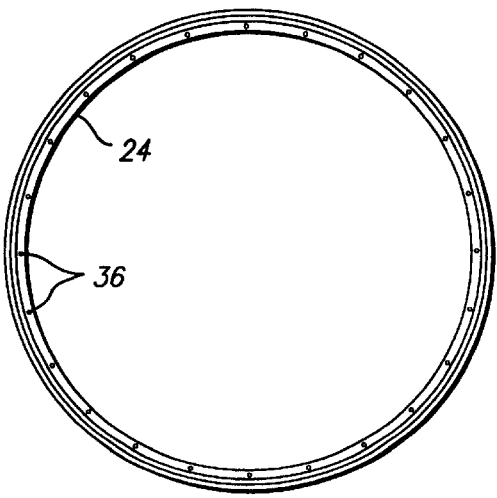
FIG. 2 is an elevation view of a second embodiment of the invention having equally spaced spoke apertures.

At least one and preferably both of the flanges 14, 24 is provided with a series of circumferentially spaced apertures 16 for receiving bent outer ends 132 of wheel spokes 130 as seen in FIG. 5A. In FIG. 1, an arrangement is shown where the apertures 16 are provided in pairs around the periphery of the wheel rim, the various pairs of spokes thereby being equally circumferentially spaced from each other but with the spacing between the pairs not necessarily being the same as the spacing between the apertures 16 of each pair. In the second embodiment shown in FIG. 2, apertures 36 are equally circumferentially spaced around the rim flanges. FIGS. 7 and 8 show alternative arrangements where the apertures 16, 26 are aligned with each other in each of the two flanges 14, 24; however, persons skilled in the art will appreciate that the apertures for receiving the bent outer ends 132 of the spokes 130 need not extend all of the way through either one or both of the joined flanges 14, 24. It will be noted that in the embodiments of FIGS. 1 and 2, the radial extent of the flanges 14, 24 is constant around the circumference of the rim.

Figure 3:
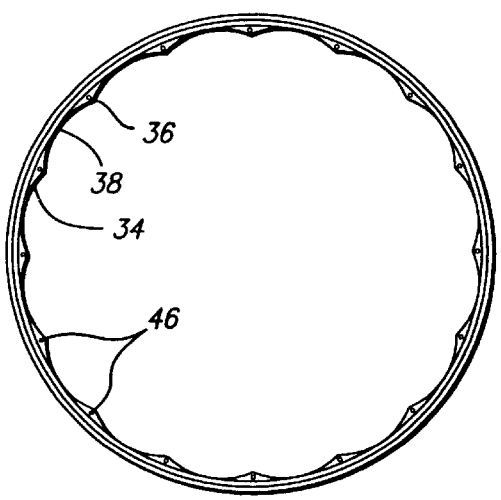
FIG. 3 is an elevation view of a third embodiment of the invention having aligned scalloped flange configuration.
Figure 4:
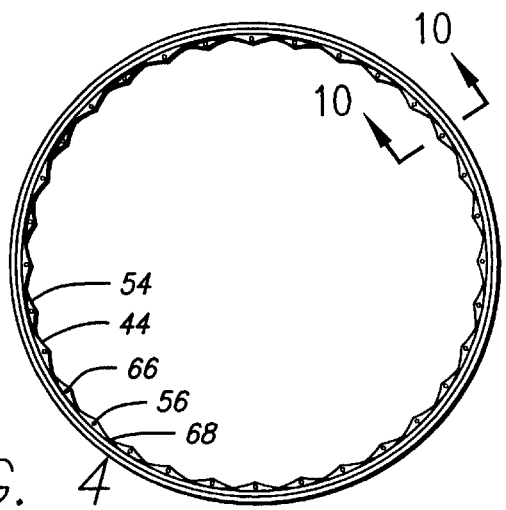
FIG. 4 is an elevation view of a fourth embodiment of the invention having a non-aligned scalloped flange configuration.

Turning now to the embodiments shown in FIGS. 3 and 4, it will be seen that in each of these embodiments the flanges 34 in FIG. 3 and 44, 54 in FIG. 4, are of varying radial extent around the circumference of the rim. Preferably, the flanges 34, 44, 54 are of scalloped configuration to define alternating peaks and valleys, 36, 38 in FIG. 3 and 66, 68 in FIG. 4. In the FIG. 3 arrangement, the peaks 36 on the flange 34 of the first rim member are aligned on each side of the rim with the peaks (not seen in FIG. 3) of the second rim member, the valleys 38 being similarly aligned. Apertures 46 extend through the central portions of the peaks in each of the joined rim members. The scalloped configuration removes unnecessary rim material between the peaks and thus reduces the weight of the finished rim. In FIG. 4 it will be seen that the peaks of one of the rim members align with the valleys of the other rim member so that spokes can be alternately provided on each side of the wheel. In the FIG. 3 arrangement, spokes may be provided in aligned pairs on each side of the wheel or they may be arranged as single spokes in an alternating fashion on either side of the wheel.

Since the rear wheel of bicycles is typically the wheel driven by a chain drive and rear wheel cluster, it is often desirable to provide a rim configuration which is non-symmetrical in radial cross section to provide a counterbalancing effect for the gear cluster as shown in FIG. 9 in which the spaced flanges 74, 84 include tire retaining beads 72, 82, respectively. Aligned apertures 16, 26 as seen in FIGS. 7 and 8 are provided in the joined flanges for receiving the bent ends of the wheel spokes 130.

FIG. 10 is a modification showing a third annular rim member 90 having radially extending flanges 92, 94 and a central portion 96 integral with the flanges which are respectively bonded to the radially extending flanges 44, 54 of the first and second rim members 10, 20. As shown in FIG. 10, the flanges 44, 54 of the first and second rim members 10, 20 are also preferably of the scalloped configuration in which the peaks of one of the flanges 44, 54 are aligned with the valleys of the other flange 54, 44 in the manner shown in FIG. 4. Accordingly, the flanges 92, 94 of the third rim member 90 are similarly configured and preferably have apertures 98 aligned with the apertures 56 for receiving the bent ends of the spokes. In this configuration, it is possible to place the wheel spokes either outside of the flanges 44, 54 or inside of the flanges 92, 94 for reduced aerodynamic drag.

For further weight reduction, one or both of the opposed rim members 10, 20 may be provided with weight reduction recesses 100 in the opposed faces of the connected flanges 14, 24 as seen in FIG. 8. Similar weight reduction recesses not shown can be provided in the three-part configuration of FIG. 10, preferably between the abutting faces of the flanges 44, 92 and 54, 94 so that the weight reduction recesses have no exterior exposed surfaces so that aerodynamic resistance is kept to a minimum.

Those skilled in the art will also understand that the symmetrical cross section profiles shown in FIGS. 6–8, the non-symmetrical cross section profile shown in FIG. 9 and the wide profile shown in the three member configuration of FIG. 10 can all be varied as desired to accommodate low or high profile inflatable tubeless or tubed tires. Apart from a conventional tire inflation aperture at a suitable location in the rim, the rim sections together define a tire receiving side which is unperforated by spoke holes or other apertures. This enables spokes to be changed without removal of the tire from the rim should a broken or bent spoke be experienced. Differing configurations of tires and rims for the type of cycling which is involved will be readily apparent to those skilled in the art depending on whether the wheels and rims are intended for on road or off road bicycling, motorcycling or other uses.

As shown in FIG. 5, the invention readily lends itself to the use of a small number of spokes 130 which are shown in spaced pairs joined to the wheel hub 120 at circumferentially substantially equally spaced locations to balance the stresses involved. The inward radial extent of the joined flanges of the rim members provides structural rigidity not attainable in typical channel shaped rims.

Finally, persons skilled in the art will appreciate that various additional modifications of the invention can be made from the above described embodiments and that the scope of protection is defined only by the limitations of the following claims.

What is claimed is:

1. A multi-part rim for a cycle wheel comprising an annular first rim member having an integrally formed tire retention bead and a radially inwardly extending flange laterally offset from said bead, an annular second rim member having an integrally formed tire retention bead and a radially inwardly extending flange laterally offset from said bead, said flanges of said first rim member and said second rim member being affixed together and said beads being laterally spaced apart to define a wheel rim, and at least one of said flanges having circumferentially spaced spoke retention apertures therein, wherein said flanges are of varying radial extent around the circumference of said rim.

2. The multi-part rim of claim 1, wherein said beads are laterally offset from said first and second flanges to form a rim having a symmetrical radial cross section.

3. The multi-part rim of claim 2, wherein said spoke retention apertures extend through both of said affixed flanges.

4. The multi-part rim of claim 1, wherein said apertures are equally circumferentially spaced.

5. The multi-part rim of claim 1, wherein said flanges are of scalloped configuration to define peaks and valleys, said apertures being in peaks of said flanges.

6. The multi-part rim of claim 5, wherein said peaks and valleys of said affixed flanges are aligned.

7. The multi-part rim of claim 5, wherein said peaks of a first one of said affixed flanges are aligned with valleys of a second one of said flanges, each of said peaks having said apertures therein.

8. The multi-part rim of claim 1, wherein said flanges are laterally offset unequal distances from said beads whereby said rim has a non-symmetrical radial cross-section.

9. A multi-part rim for a cycle wheel comprising an annular first rim member having an integrally formed tire retention bead and a radially inwardly extending flange laterally offset from said bead, an annular second rim member having an integrally formed tire retention bead and a radially inwardly extending flange laterally offset from said bead, said beads being laterally spaced apart to define a wheel rim, and at least one of said flanges having circumferentially spaced spoke retention apertures therein, further comprising a third annular rim member having spaced radially inwardly extending flanges respectively affixed to said radially extending flanges of said first and second annular rim members, said third annular rim member having an imperforate annular lateral extent between said flanges of said third annular rim member.

10. The multi-part rim of claim 9, wherein at least some of said apertures extend through at least one of said flanges of said third annular rim member.

11. A multi-part rim for a cycle wheel comprising an annular first rim member having an integrally formed tire retention bead and a radially inwardly extending flange laterally offset from said bead, an annular second rim member having an integrally formed tire retention bead and a radially inwardly extending flange laterally offset from said bead, said flanges of said first rim member and said second rim member being affixed together and said beads being laterally spaced apart to define a wheel rim, and at least one of said flanges having circumferentially spaced spoke retention apertures therein, wherein at least one of said members includes weight reduction recesses therein.

12. The multi-part rim of claim 11, wherein said flanges are of constant radial extent around the circumference of said rim.

13. The multi-part rim of claim 11, wherein said weight reduction recesses comprise annularly extending recesses in said flanges.

14. The multi-part rim of claim 13, wherein said recesses are in opposed connected radially extending surfaces of said flanges.

15. The multi-part rim of claim 1, wherein said parts are made of metal.

16. The multi-part rim of claim 15, wherein said flanges are connected by riveting.

17. The multi-part rim of claim 15, wherein said flanges are connected by welding.

18. The multi-part rim of claim 1, wherein said parts are made of composite material.

19. The multi-part rim of claim 18, wherein said flanges are connected by adhesive bonding.

20. A wheel comprising the rim of claim 1, a hub centrally located in said rim and a plurality of spokes connecting said rim to said hub, said spokes having bent ends received in said apertures in said flanges.

21. The wheel of claim 20, wherein said spokes are arranged in equally spaced pairs.

22. The wheel of claim 20, further comprising an inflatable tire retained on said rim by said beads.

* * * * *